United States Patent [19]

Yamamoto

[11] 4,234,398
[45] Nov. 18, 1980

[54] CARBON FIBER SURFACE TREATMENT

[75] Inventor: Ryuichi Yamamoto, Ehime, Japan

[73] Assignee: Toray Industries, Inc., Tokyo, Japan

[21] Appl. No.: 27,880

[22] Filed: Apr. 6, 1979

[30] Foreign Application Priority Data

Apr. 12, 1978 [JP] Japan .............................. 53-42098

[51] Int. Cl.³ .......................... C01D 7/34; B01K 1/00
[52] U.S. Cl. .................................................. 204/130
[58] Field of Search ............... 204/130, 132, DIG. 7, 204/28, 129.5

[56] References Cited

U.S. PATENT DOCUMENTS

| 3,597,335 | 8/1971 | Humpage | 204/211 |
| 3,650,935 | 3/1972 | Andersson | 204/28 |
| 3,671,411 | 6/1972 | Ray | 204/130 |
| 3,759,805 | 9/1973 | Chapman | 204/130 |
| 3,859,187 | 1/1975 | Druin | 204/130 |
| 4,050,997 | 9/1977 | Heissler | 204/130 |
| 4,128,459 | 12/1978 | Bretts | 204/206 |

FOREIGN PATENT DOCUMENTS 1433712  4/1976  United Kingdom ............... 204/130

Primary Examiner—T. M. Tufariello
Attorney, Agent, or Firm—Miller & Prestia

[57] ABSTRACT

The surface of a carbon fiber is treated to improve the strength of its bond with a matrix. The fiber is made an anode by connecting it electrically with the anode current input terminal of an electrolytic treatment bath containing an electrolyte and having a cathode. The fiber is subjected to electrolysis in the bath. The relative distance between the fiber and the cathode in the bath decreases as the distance from the anode current input terminal along the fiber is increased.

15 Claims, 10 Drawing Figures

CARBON FIBER SURFACE TREATMENT

BACKGROUND OF THE INVENTION

Carbon fibers have been used for many purposes in composite materials because of their exceedingly high tenacity. However, as is generally known, the adhesion between carbon fibers and resin matrices is not good. For this reason the surface of the carbon fiber is usually treated to increase the surface wetability or adhesion of the carbon fiber to the resin and to increase the interlaminar shear strength (ILSS) of the composite material.

Electrolytic oxidation of the carbon fiber surface is available and is extensively used for this purpose, but it is not without serious disadvantages.

The surface treatment of carbon fibers has heretofore been described in Japanese Patent Publication No. 29942/72, assigned to the assignee hereof. Although that publication describes an electrolytic treating bath including anodic terminals which are designed to permit the carbon fiber yarn to be fed to and to be taken from the bath without directly contacting the terminals, together with a means for continuously flowing and flushing the electrolyte through the anodic terminals, problems have been encountered in attempting to produce strong carbon fibers, having uniform strength along their lengths, utilizing carbon fiber surface treatments as disclosed therein, as will be developed further by reference to FIG. 1 of the drawings, which shows an anodic and cathodic arrangement of the type disclosed in the aforesaid Japanese Patent Publication. In FIG. 1, carbon fiber (CF) 1 taken off from a reel (not shown) is conducted onto an anode current input terminal 2 which is connected as anode to a current supply 3 and is supplied with anodic current. It then passes through an electrolytic bath 4. Cathode 5 in the electrolytic bath 4 is connected to the current supply 3 and is positioned beneath the running carbon fiber, which is kept substantially parallel to the cathode 5, and passes the second terminal 2 also connected as an anode to the current supply 3. The running fiber is then taken up on a reel (not shown).

In the foregoing procedure, the surface of the carbon fiber becomes the anode in the electrolytic bath 4 and is continuously oxidized by electrolysis. The electrical potential on the carbon fiber decreases as it moves away from the terminals 2 because of its rather high electrical resistivity compared with usual electric conductors such as metals and the like. The density of the current which flows out of its surface also decreases, and as a result, the carbon fiber in passing through the electrolytic bath does not undergo a uniform electrolysis and the effect of its surface treatment is variable.

The term "density of current flowing from the carbon fiber" as used herein means the density of current per unit length of carbon fiber and is represented by the following equation:

$$\frac{dI}{dX} = \frac{1}{\rho} \cdot \frac{d^2V}{dX^2}, \text{ where}$$

$\frac{dI}{dX}$ means current per unit length $(A/m)$ $\rho$ means electrical resistivity per unit lengths of carbon fibers $(\Omega/m)$, and -continued $\frac{d^2V}{dX^2}$ means variation of potential gradient on carbon fiber. $(V/m^2)$ In the surface treatment of carbon fibers, excessive current density causes deterioration of the tensile strength of the treated fiber. On the other hand, insufficient current density decreases the efficiency and the effectiveness of the surface treatment and adversely affects adhesion between the fiber and the resin matrix. Accordingly, problems have arisen, especially when a high current density was required, since this caused serious deterioration of tensile strength as a result of the electrolytic treatment. This has occurred, for example, in the case of tow type or woven structure carbon fibers which have higher density of fiber than the usual carbon fibers or graphite fibers which have more lubricity than the usual carbon fiber.

Efforts have been made to improve the uniformity of the electrolytic treatment of carbon fibers and to overcome the disadvantages of non-uniformity by compensating or adjusting the potential and the current density of the carbon fiber running through the electrolytic bath, attaching plural terminals supplying anodic current, and applying uniformity of electrolysis. A typical example of such a suggestion appears in British Pat. No. 1,326,736, published Aug. 15, 1973, which indicates that current may be transferred to a carbon fiber by standard means such as by clips, or by passing the fiber through mercury, or over a metal or carbon or other conductive material roller which serves as the anode current input terminal. Similar comments and suggestions appear in the United States Patent to Chapman et al. U.S. Pat. No. 3,759,805, granted Sept. 18, 1973. However, proposals of this type have been found to be disadvantageous in that the act of increasing the number of terminals and the number of times the carbon fiber touches the terminals has tended to damage the carbon fiber surface mechanically. As a result, the carbon fiber has tended to develop considerable surface fuzz and to wind or bend itself around the terminals, seriously interfering with processability and with product quality.

OBJECTS OF THE INVENTION

An important object of this invention is to provide a method of surface treating a carbon fiber by electrolysis in a uniform and stable manner and to provide an apparatus for doing so. Another object of this invention is to provide a method of treating not only continuous filament carbon fibers but also carbon fiber materials having high densities and containing large numbers of carbon fibers as are found in tow or woven structures, for example. Still a further object is to surface treat fibers the strength of which is seriously affected by electrolytic surface treatment, such as graphite fibers, for example, and to provide apparatus for accomplishing the foregoing. Yet another object of this invention is to provide a method of effectively surface treating carbon fibers without causing them to wind or bend around the parts of the apparatus or to develop significant amounts of surface processability. Other objects and advantages of this invention will appear in further detail hereinafter.

BRIEF SUMMARY OF THE INVENTION

In accordance with this invention the relative distance between any point on the surface of the carbon fiber and the cathode is decreased in relation to the distance of that point from the cathode, and the current density all along its surface is maintained substantially constant. It has been found possible in this manner to achieve uniform treatment by electrolysis.

DETAILED DESCRIPTION OF THE INVENTION

Methods and apparatus for surface treating carbon fibers in accordance with the present invention will be further described in the following portion of this specification with specific reference to the figures of the drawings, which show specific embodiments of the invention and are not intended to limit the scope of the invention, which is defined in the appended claims.

Figure 2:
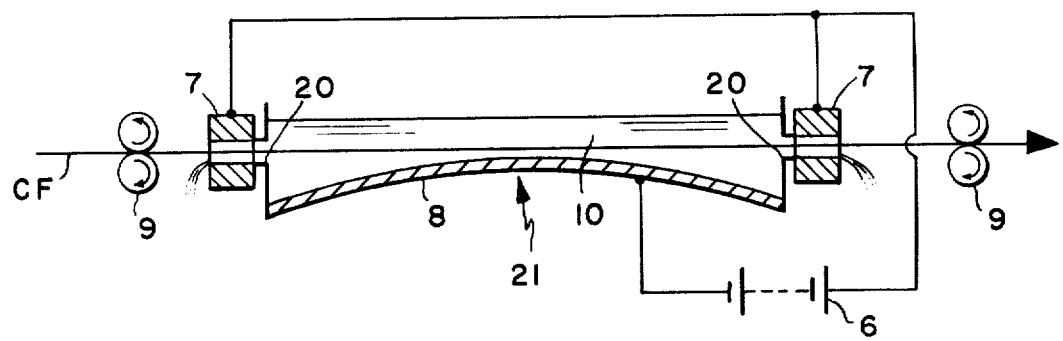
FIGS. 2-4 are schematic views in cross section of electrolytic apparatus according to this invention.
Figure 3:
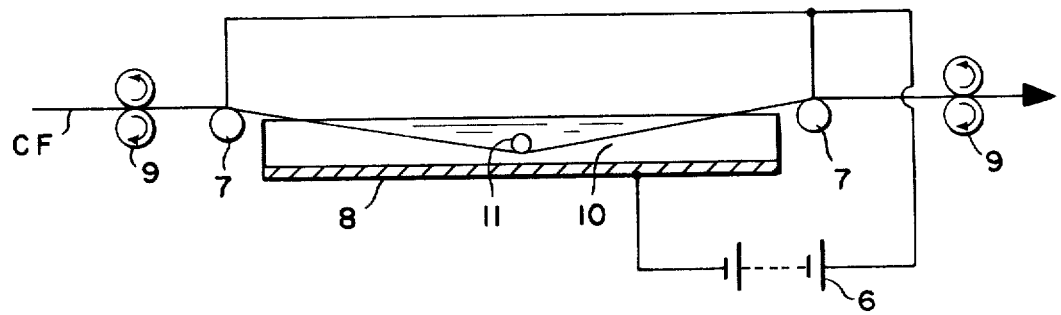
Figure 4:
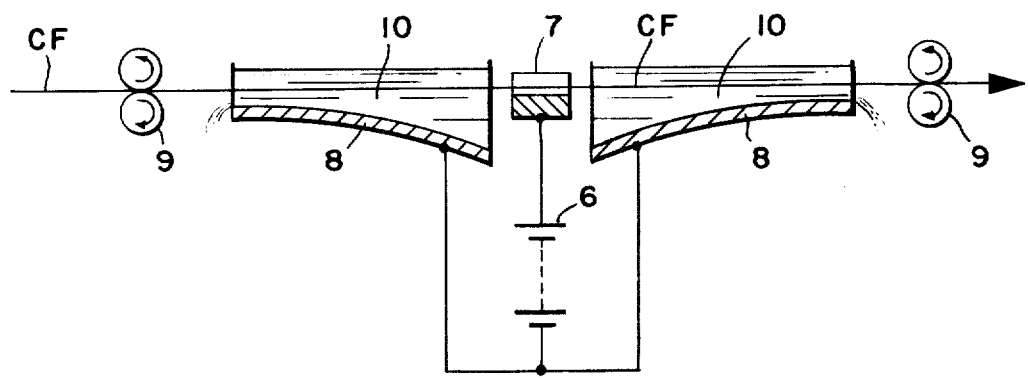

FIGS. 2-4 schematically show different electrolytic baths which are useful for treating the surfaces of carbon fibers according to this invention. In all of FIGS. 2-4 the number 6 designates a direct current power source, 7 designates anode current input terminals, 8 is a convex cathode plate, 9 are rotating thread guides, 10 is an electrolytic bath and (CF) means carbon fiber.

In FIG. 2, the carbon fiber (CF) is a continuous filaments yarn and passes through the hole of the anode current input terminal 7 which is connected to the anode of the direct current power source 6. The passageway in the anode current input terminal, through which the carbon fiber passes, is immersed in and filled with the electrolyte of the electrolytic bath 10. The carbon fiber (CF) passes through the electrolytic bath 10 and through the other anodic terminal 7 and is taken up on a reel (not shown), for example. Many well known electrically conductive materials may be used as cathodes. These include metal plates, metal nets, metal bars or graphite shaped articles.

In accordance with this invention, the density of the current flowing out of the carbon fiber running through the electrolytic bath 10 is kept substantially constant by adjusting the relative distance between the carbon fiber and the cathode 8. Accordingly, it is preferable to use a cathode having a length as great as the span of the carbon fiber running through the electrolytic bath 10.

FIGS. 3 and 4 show other examples of electrolytic apparatus in accordance with this invention. In FIG. 3, the cathode 8 is straight and the relative distance between carbon fiber (CF) running through the electrolytic bath 10 is controlled by changing the running direction of the carbon fiber (CF) by providing a thread guide 11 immersed in the electrolytic bath at a location below the level of the spaced anodes, 7, 7. Accordingly, the distance between carbon fiber (CF) and the cathode 8 decreases as the carbon fiber moves away from the upstream anode current input terminal and increases as the carbon fiber (CF) moves toward the exit terminal 7.

In FIG. 4, on the other hand, a single anode current input terminal 7 is positioned between two separate electrolytic baths, each having a cathode 8 which is curved convexly upwardly. The path of the carbon fiber, between guide rollers 9, is straight. Thus, each cathode 8 is inclined to the path of movement of the carbon fiber (CF). Accordingly, the relative distance between any point on the straight carbon fiber (CF) and the cathode 8 is decreased upon increase of the distance of the carbon fiber from the anode current input terminal 7, and vice versa.

In the examples shown in FIGS. 2-4, the distance between any point on the surface of the carbon fiber running through the electrolyte bath and the cathode is designed to keep the density of the current flowing out of the carbon fiber substantially constant. This is nicely achieved in FIG. 2, for example, by controlling the curvature of cathode 8.

In FIG. 3 the desired results may be obtained by controlling the path of the carbon fibers with the thread guide 11, and in FIG. 4, this is done by controlling the curvature and/or inclinations of cathodes 8, which may be curved or straight.

It is preferred to maintain the minimum distance between the carbon fiber path and the cathode at a value less than one-half the maximum distance between the carbon fiber path and the cathode. For example, in FIG. 2, the minimum distance is at the center of the bath and is less than ⅓ of the maximum distance which occurs at the entrance and exit 20, 20 of the electrolyte bath 10. This "less than one-half" value surprisingly enhances the ability to maintain substantially constant fiber current density and to attain optimum processability.

It is preferable in this invention to use subsidiary cathodes to control precisely and easily the density of the current flowing out of the carbon fiber. In FIG. 2, for example, the density of the current flowing out of the carbon fiber can be kept constant more precisely by positioning one or more subsidiary cathodes near the carbon fiber path in the electrolytic bath, and by controlling its electrical potential.

In accordance with this invention the density of current flowing out of the carbon fiber as it runs through the electrolytic bath is kept substantially constant. This means that the maximum value of the current density is controlled within about 10% of the average value of the current density throughout the fiber path. That is, when the maximum current density value exceeds 110% of the mean value the resulting carbon fiber has inferior characteristics, particularly tensile strength.

The parameters used in a specific example of actual electrolytic treatment using an apparatus as shown in FIG. 2 are as follows:

Size of bath: 1000 mm long×300 mm. wide×70 mm.deep

Treated fiber: graphite yarn 0.4 g/m×20 filaments

Yarn speed: 2.0 meters/min.

Current: 1.0 A/yarn

Relative distance between carbon fiber and cathode:
50 mm (at the entrance and exit)
15 mm (at the middle 21 of the bath)

Figure 6:
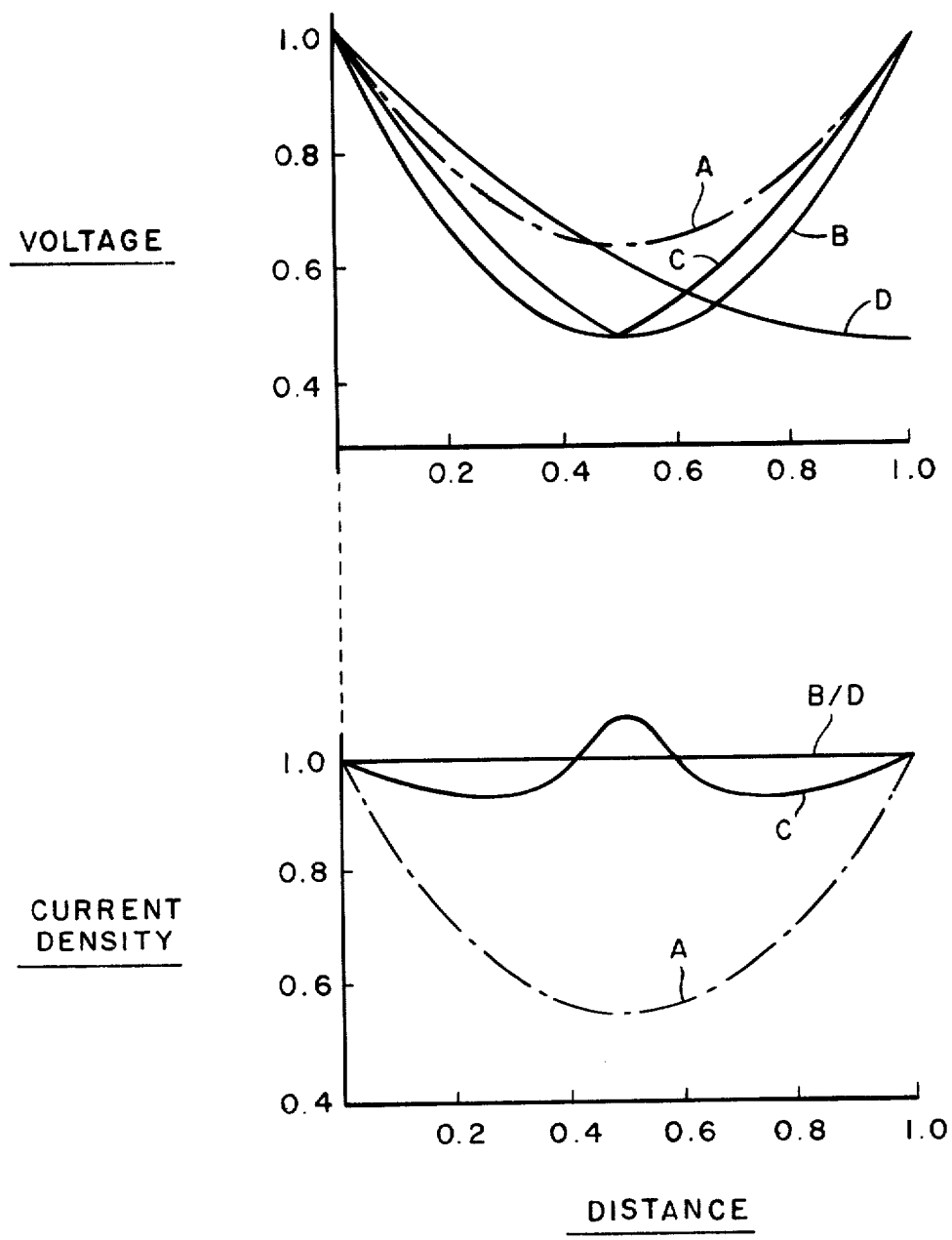
FIG. 6 is a graph which shows the relationship among (1) the distance of any point on the surface of the carbon fiber from the anode, (2) the voltage and (3) the density of the carbon fiber output current.

When carbon fibers were treated as above mentioned, the density of current flowing out of the carbon fibers was kept substantially constant, as is shown in FIG. 6.

FIG. 6 is a graph showing variations of current density versus the distance of the carbon fiber from the anode current input terminal, when the fiber is treated continuously in electrolytic apparatus as shown in FIGS. 1 to 4. In the case of the conventional apparatus of FIG. 1, the variation is great as shown by dot-dash curve (A). In the cases of FIGS. 2 to 4, on the contrary, the deviations of the curves (B), (C) and (D) respectively are small and the current density is kept nearly constant.

Figure 7:
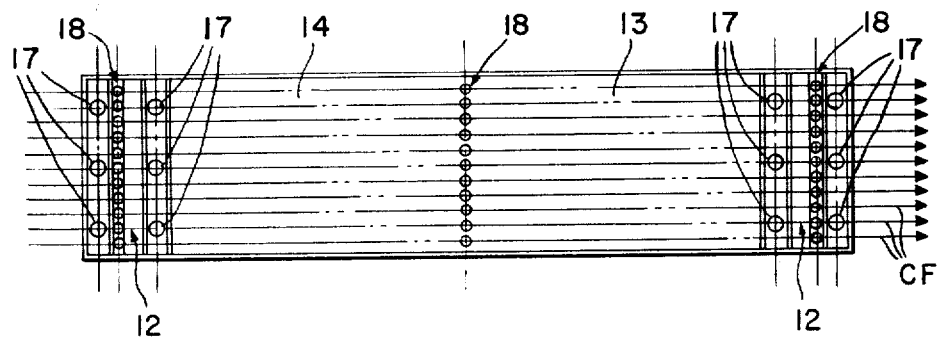
FIG. 7 is a plan view showing another embodiment of the invention.
Figure 8:
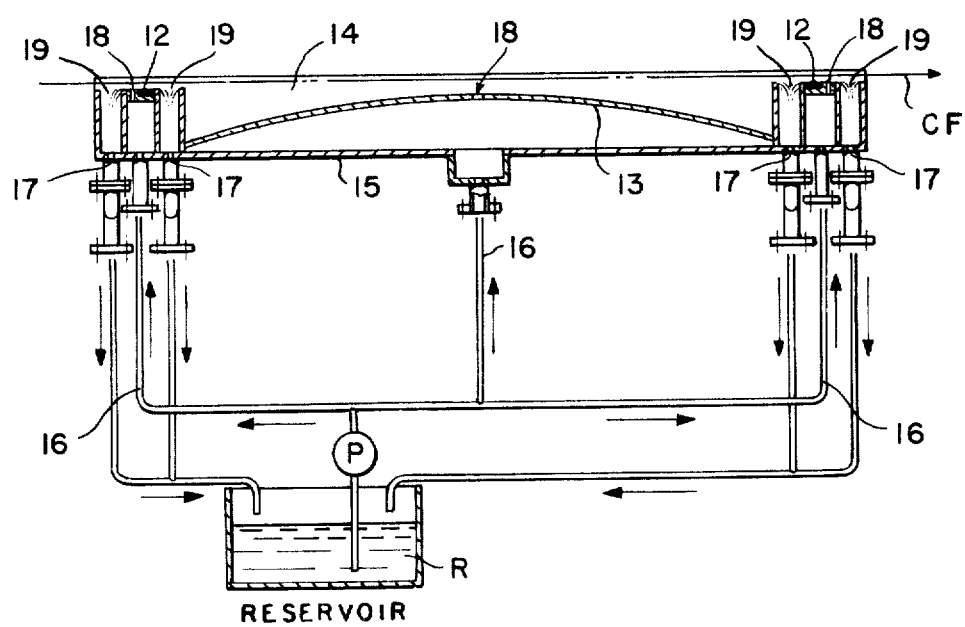
FIG. 8 is a longitudinal sectional view of the apparatus shown in FIG. 7.

FIGS. 7 and 8 of the drawings illustrate in somewhat more detail a further embodiment of the invention, which is similar in many respects to the more schematically shown apparatus of FIG. 2. The apparatus of FIGS. 7 and 8 is particularly applicable for treating large numbers of graphite yarns each consisting, for example, of about 6,000 filaments per yarn. As will be apparent in FIG. 7, 11 running runs are shown being treated in parallel, and moving continuously from left to right as viewed in the drawing. The numbers 12 indicate the upstream and downstream anode plates, and the number 13 designates the arched cathode plate. The electrolyte 14 is maintained in a bath having a bottom 15 and an electrolyte supply pipe 16. The number 17 designates electrolyte return conduits, which receive the electrolyte from an overflow apparatus having an inlet 18 and an outlet 19. It will be apparent that the overflow apparatus shown in FIGS. 7 and 8 of the drawings provides a means for continuously flowing and flushing the electrolyte through the anode plates 12, these anode plates preferably being constructed as previously illustrated and described in connection with FIGS. 5 (A), 5(B) and 5(C). A pumping means P is provided for introducing the electrolyte into all of the supply conduits 16, and a reservoir R is provided for electrolyte storage. It will be apparent from FIG. 7 that an individual electrolyte inlet 18 is provided immediately beneath the path of each running carbon fiber yarn (CF), in the area of each anode plate 12 and at the center of the bath. Several spaced apart electrolyte return conduits 17 are provided at predetermined positions across the bath.

The voltage figures and curves in FIG. 6 are provided in view of their relationship to the current figures.

The present invention will now be further described with reference to the following Examples, which are not intended to limit the scope of the invention as defined in the appended claims.

EXAMPLE 1

A mixture of acrylonitrile 99 mol/%, sodium allylsulfonate 0.5 mol/%, and 2-hydroxyethylacrylonitrile was polymerized in a dimethylsulfoxide (DMSO) solvent. A polymer dope whose concentration was 22% was filtered many times and was almost completely freed of impurities and then it was spun into a water solution of DMSO through spinnerets having 6,000 holes. After washing, drawing and drying, acrylic filaments were obtained having a denier of 1.2 denier per filament and a dry tenacity of 5.6 g/d.

This precursor was subjected continuously to an oxidation process, a carbonizing process and an after treatment process to produce carbon fibers at a speed of 10 m/min. The oxidation process was performed in hot air at 250° C. for 2 hours, and the carbonizing process was performed in a nitrogen atmosphere at a maximum temperature of 1300° C. The apparatus shown in FIG. 2 was used as the surface treatment apparatus. Its maximum depth was 10 cm and its minimum depth was 3.2 cm. The total voltage was 15 V and the current was 0.8 A/yarn. The treated carbon fiber had a tensile strength of 325 kg/mm$^2$ and an ILSS of 8.7 kg/mm$^2$.

EXAMPLE 2

Carbon fiber of Example 1 was heated continuously in a graphitizing process and aftertreated at a speed of 1 m/min. The graphitizing process was performed in a nitrogen atmosphere at a maximum temperature of 2450° C. The apparatus of FIG. 2 was applied for the surface treatment. The total voltage was 15 V and the current was 0.8 A/yarn. The treated graphite fiber had a tensile strength of 282 kg/mm$^2$ and an ILSS of 7.3 kg/mm$^2$.

EXAMPLE 3

Polymer dope prepared in Example 1 was filtered many times and was freed of any impurity, and then it was spun into a water solution of DMSO through spinnerets having 20,000 holes. After washing, drawing and drying, 6 yarns were gathered and put into a crimper, and an acrylic tow was obtained. The tow had 120,000 filaments of 2.0 denier per filament and its dry tenacity was 4.9 g/d.

The precursor tow was treated continuously through an oxidation process, a carbonizing process and a surface treatment process at a speed of 2 m/min. The oxidation process was performed in hot air at 240° C. for 3 hours, and the carbonizing process was performed in a nitrogen atmosphere at a maximum temperature of 1300° C. The apparatus of FIG. 2 was used for the surface treatment. The total voltage was 15 V and the current was 15 A. The treated carbon fiber tow had a tensile strength of 287 kg/mm$^2$ and an ILSS of 8.1 kg/mm$^2$.

COMPARATIVE EXAMPLE 4

The acrylic filament yarn obtained in Example 1 was oxidized and carbonized the same as in Example 1. As surface treatment apparatus, the apparatus shown in FIG. 1 was used. The length of its cathode was 1 meter and its depth was 10 cm. The yarn was treated under a total voltage of 19 V and the current was 0.8 A/yarn. The treated carbon fiber had a tensile strength of 278 kg/mm$^2$ and an ILSS of 8.7 kg/mm$^2$.

COMPARATIVE EXAMPLE 5

Figure 1:
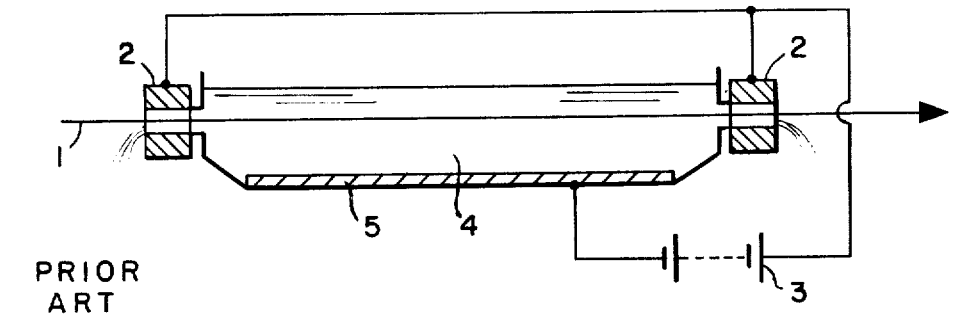
FIG. 1 is a view in cross section of a typical conventional apparatus for treating a carbon fiber surface.

Carbon fiber obtained in Example 1 was graphitized the same as in Example 2, and was surface treated in the apparatus of FIG. 1 of the drawings. The total voltage was 18 V and the current was 0.8 A/yarn. The treated graphite fiber had a tensile strength of 221 kg/mm$^2$ and an ILSS of 7.1 kg/mm$^2$.

COMPARATIVE EXAMPLE 6

The filament tow of 120,000 filaments obtained in Example 3 was oxidized and carbonized the same as in Example 3. As surface treatment apparatus, the apparatus of FIG. 1 of the drawings was applied. The total voltage was 18 V and the current was 15 A. The treated tow had a tensile strength of 232 kg/mm$^2$ and an ILSS of 8.0 kg/mm$^2$.

COMPARATIVE EXAMPLE 7

Non-treated yarns and tows were sampled in Examples 1, 2 and 3. Their tensile strengths and ILSS values were as follows:

| Yarn and Tow | Item | Tensile Strength (Kg/mm²) | ILSS |
|---|---|---|---|
| Non-treated carbon fiber of Example 1 | | 327 | 6.9 |
| Non-treated graphite fiber of Example 2 | | 293 | 4.3 |
| Non-treated carbon fiber tow of Example 3 | | 280 | 6.5 |

Figure 5A:
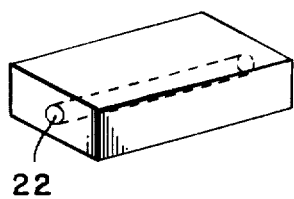
FIGS. 5 (a), (b) and (c) are schematic perspective views of anodic current input terminals preferably used in the electrolytic apparatus of this invention.
Figure 5B:
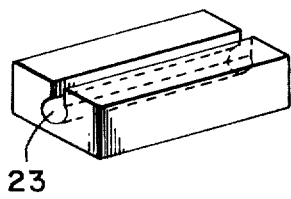
Figure 5C:
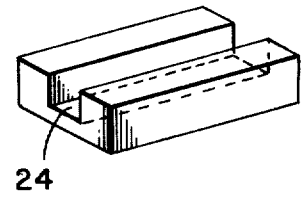

It will accordingly be appreciated that, in the electrolytic apparatus of this invention, the anode current input terminals preferably do not touch the carbon fibers running through the bath. This is achieved by maintaining tension on the carbon fibers between input and output rolls 9, 9 and by providing space in the electrodes 7 through which the carbon fibers may pass. In this manner, the carbon fiber is prevented from winding around the terminal and from fuzzing. Particularly in electrolytic apparatus of the type shown in FIGS. 2 and 4, the carbon fibers run completely freely, at least in the electrolyzing bath, so that the process has long term stability and at the same time the treated carbon fibers develop excellent characteristics. Examples of non-touching anode current input terminals are shown in FIGS. 5(A), (B) and (C), wherein the terminals have passageways 22, 23 and 24 through which the carbon fibers run. The electrolytic bath liquid fills the passageways 22, 23 and 24, the carbon fiber is fed through the passageway without touching and anodic current is caused to flow through the layer of the electrolysis liquid. The fluid may be maintained in a flowing condition in a variety of ways known per se, for example, by using a reservoir and a pumping arrangement as shown in Japanese Patent Publication No. 29942/72, or in FIGS. 7 and 8 herein.

Materials suitable for use as cathodes in this invention are, for example, graphite, nickel and stainless steel which have high resistivity against corrosion in electrolysis liquids. Thin plates, slender rods or wire net of such materials are easily shaped into the desired convex or other shapes. Electrolytes suitable for this invention include many types of well known solutions such as sulfuric acid, nitric acid, boric acid, alkali metal hydroxides or ammonia. The electrolyte concentration is usually in the range from about 1% to about 10%. The temperature of the electrolytic bath is preferably from room temperature to about 80° C. As an electrolytic condition, voltage must be greater than the decomposition voltage of the applied electrolyte, and is preferably greater than about 2 volts. The current density is preferably greater than about 1 A/m².

Carbon fibers treated in accordance with this invention include many different types of well known carbon fibers and graphite fibers and are not limited to the Examples used herein.

In the practice of this invention the number of anode current input terminals can be varied, and in a particular case, only a single terminal is efffective. Rollers were heretofore used generally as anode current input terminals, and the more the terminals, the more the fuzz that is generated on the fiber, because of electric sparks and other reasons. Further, in some particular cases running carbon fiber yarn has been found to bend itself around the rollers and to break off. In case of the non-touch type anode current input terminal, a precious metal such as platinum must be used as the anode for preventing oxidizing corrosion. In view of the cost of the precious metal it is desirable economically to reduce the required number of anodes to a minimum. According to this invention, the density of current flowing out of the carbon fiber is kept nearly constant during the electrolytic treatment, and the surface of the carbon fiber is treated uniformly.

As shown in FIGS. 2 and 4, the carbon fiber is free from touching any guide rollers in the bath or any anode current input terminals, while running through the electrolytic apparatus. When this carbon fiber is treated according to the method of this invention, very little formation of surface fuzz is encountered and no string breakage takes place on the carbon fiber.

Moreover, the carbon fiber does not bend itself around thread guides or rollers during the electrolytic treatment, and processability and efficiency of the electrolytic treatment are excellent.

In the present invention, moreover, graphite fibers and carbon fiber tows and webs may be effectively treated, as well as ordinary carbon fibers. Graphite fibers have more slippery surfaces than ordinary carbon fibers made at a lower temperature and their ILSS values are not adequate when they are treated at the same electrical voltages and current densities as ordinary carbon fibers. In order to obtain an adequate ILSS value, graphite fibers must be treated with about 10 times the severity as compared to ordinary carbon fibers, and accordingly a very uniform current density is required. And in the case of carbon fiber tows and webs, which have high fiber densities in the treating baths, the effect of the treatment tends to vary among the respective filaments, and a greater quantity of electricity is often required. This is another reason why the current density should be controlled uniformly longitudinally of the carbon fiber path.

Although this invention has been described with reference to certain specific forms thereof, it will be appreciated that many variations may be made without departing from the spirit and scope of this invention, wherein the distance between any point on the carbon fiber, at any given time during its passage through the electrolytic treatment, varies in a pre-determined manner. Particularly, the distance of such point from the cathode varies inversely to the distance of that point from the nearest anode, i.e. when the distance of that point from the anode is increased, the distance of that point from the cathode is decreased, and vice versa. For example, in FIGS. 2, 3, 7 and 8 an anode is provided at each end of the treatment path. Assuming the carbon fiber to be progressing from the left to the right as viewed in the drawings, as soon as a predetermined point on the carbon fiber leaves the left-hand anode 7 it moves closer to the cathode 8 as it moves away from this (nearest) cathode 7. On the other hand, after passing through the middle portion of the treatment bath, the same predetermined point on the surface of the carbon fiber is then moving away from the cathode 8 and toward the right-hand anode 7 as illustrated in the drawings. In this latter portion of movement of the predetermined point, its distance from the nearest anode is decreasing and its distance from the cathode is increasing. It is in this sense that we refer to the inverse relationship between the position of the point on the path of the carbon fiber from the anode and from the cathode, without implying any specific proportional relationship in such inverse relationship. It is highly preferable, however, to so proportion the inverse relationship that, as stated heretofore the current density emanating from any predetermined point on the carbon fiber, as it progresses through the treatment zone, remains substantially constant.

Although the form of the invention shown in FIG. 2 illustrates a straight line carbon fiber path combined with a convex cathode, and wherein the arrangement appearing at FIG. 3 shows a generally concave carbon fiber path combined with a substantially straight cathode surface, it will be appreciated that many different arrangements may be utilized as well. For example, it is possible to combine a substantially concave fiber path with a sub-stantially convex cathode configuration. Other modifications will readily occur to those skilled in the art.

Variations may also be made with respect to the positioning or placement of the anodes. Although FIGS. 2, 3, 7 and 8 show anodes at the inlet and outlet portions of the treatment bath, a single, centrally located anode may be utilized in the manner appearing in FIG. 4. In such an arrangement the inverse relationship as between the distance of a given point on the carbon fiber from the anode, in relation to the distance of the same point from the cathode, is still maintained. In FIG. 4, the aforesaid given point begins the treatment process by moving toward the anode 7 and away from the cathode 8. After having passed through the middle portion of the treatment process, the same point is moving away from the anode 7 and toward the right-hand cathode 8. Thus, the distance of the aforesaid given point from the nearest anode always varies inversely in relation to its distance from the nearest cathode.

Other variations may be made, with respect to materials, solutions, etc., all without departing from the spirit and scope of this invention as defined in the appended claims.

We claim:

1. In a method for continuously surface treating a carbon fiber, wherein the fiber is connected electrically to an anode current input having a predetermined location and conducted on the run with successive portions of said fiber moving toward or away from said input and through an electrolytic treatment bath which contains an electrolyte and a cathode, wherein said cathode is positioned along the fiber path in the bath and wherein the fiber is subjected to electrolytic oxidation treatment in the bath, the method step selected from the group consisting of
    (a) conducting moving portions of the fiber closer to the cathode in the bath as said fiber portions move away from the anode current input, and
    (b) moving the fiber portions farther from the cathode in the bath as they move toward said anode current input, whereby the current density applied to the fibers is maintained substantially constant along the fiber path through said bath.

2. The method defined in claim 1, wherein said carbon fiber is in the form of a tow having a total denier of about 30,000–1,000,000.

3. The method defined in claim 1, wherein said carbon fiber is in the form of a woven fabric.

4. The method defined in claim 1, wherein said carbon fiber is a graphite fiber.

5. The method defined in claim 1, including the step of guiding said carbon fiber along a predetermined path through the bath and varying the relative distance between the fiber and the cathode along said path by arranging the portions of the cathode at different distances from said path.

6. The method defined in claim 1, including the step of arranging said cathode in the bath with a substantially straight surface configuration and varying the relative distance between the fiber and the cathode by arranging a fiber path which extends in a direction toward and away from said cathode surface so as to change the relative distance between the fiber and the cathode in the bath and to decrease said relative distance with increase of the distance from the anode current input terminal along the fiber.

7. The method defined in claim 1, including the step of running said carbon fiber along a concave line and arranging the cathode along a convex line so as to decrease the relative distance between the fiber and the cathode in the bath with increase of the distance from the anode current input terminal along the fiber.

8. The method defined in claim 7, wherein the closest distance between the fiber and the cathode is not more than half the greatest distance between the fiber and the cathode in the bath.

9. The method defined in claim 5, wherein the cathode is formed of an electroconductive plate.

10. The method defined in claim 5, wherein the cathode is formed of an electroconductive net.

11. The method defined in claim 5, wherein the cathode is formed of an electroconductive bar.

12. A method for treating the surface of a carbon fiber wherein the fiber is connected electrically to a plurality of anodic current input terminals which are spaced apart from one another to form a treatment path in an electrolytic treatment bath containing an electrolyte and a cathode, wherein said cathode is positioned along the fiber path in the bath and wherein the fiber is subjected to electrolysis treatment in the bath, the steps which comprise
    (a) decreasing the relative distance between a moving portion of the fiber from the cathode in the bath while increasing the distance of said portion from the nearer anode and decreasing the distance of said portion from the farther anode, and
    (b) increasing the relative distance of said moving portion of the fiber from the cathode while decreasing the distance of said portion from the nearer anode and increasing the distance of said portion from the farther anode, whereby the current density applied to the fibers is maintained substantially constant along the fiber path through said bath.

13. The method defined in claim 12, wherein said carbon fiber is arranged substantially straight in the bath and the cathode has a convex surface.

14. The method defined in claim 13, wherein he cathode is formed of an electroconductive plate.

15. In a method for surface treating a carbon fiber, wherein the fiber is conducted on the run while connected electrically to an anodic current input and conducted throgh an electrolytic treating bath which contains an electrolyte and a cathode, wherein said cathode is positioned along the fiber path in the bath, and wherein successive moving portions of said fiber are subjected successively to electrolytic oxidation treatment in the bath, the step which comprises varying the distance of each successive fiber portion from said cathode inversely to the distance of said portion from said anodic current input, whereby the current density applied to the fibers is maintained substantially constant along the fiber path through said bath.

* * * * *